United States Patent
Inoue (10) Patent No.: US 6,819,794 B2
(45) Date of Patent: Nov. 16, 2004

(54) IMAGE PROCESSING APPARATUS, IMAGE PROCESSING METHOD, STORAGE MEDIUM AND PROGRAM

(75) Inventor: Hitoshi Inoue, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 644 days.

(21) Appl. No.: 09/791,586

(22) Filed: Feb. 26, 2001

(65) Prior Publication Data

US 2001/0021269 A1 Sep. 13, 2001

(30) Foreign Application Priority Data

Feb. 29, 2000 (JP) ........................................ 2000-053118

(51) Int. Cl.$^7$ ................................................. G06K 9/00
(52) U.S. Cl. ........................ 382/169; 382/132; 382/274
(58) Field of Search ................................. 382/131, 132, 382/168, 169, 274; 358/461

(56) References Cited

U.S. PATENT DOCUMENTS

| | | | | |
|---|---|---|---|---|
| 4,792,979 A | * | 12/1988 | Nomura et al. | ............. 382/169 |
| 5,265,200 A | * | 11/1993 | Edgar | ........................ 382/169 |
| 5,502,775 A | | 3/1996 | Takeo | ........................ 382/169 |
| 5,793,886 A | * | 8/1998 | Cok | ........................ 382/169 |
| 6,633,657 B1 | * | 10/2003 | Kump et al. | ................. 382/128 |

FOREIGN PATENT DOCUMENTS

JP  5168615  7/1993  ............ H04N/1/04

* cited by examiner

*Primary Examiner*—Amelia M Au
*Assistant Examiner*—Colin LaRose
(74) *Attorney, Agent, or Firm*—Fitzpatrick, Cella, Harper & Scinto (57) ABSTRACT

A first unit obtains a gradation conversion characteristic for equalizing a histogram of an input image. A second unit obtains an inverse characteristic of a gradation conversion characteristic for equalizing a histogram of an image to which a predetermined gradation conversion is applied. A third unit composites the gradation conversion characteristic obtained by the first unit and the inverse characteristic obtained by the second unit. A fourth unit performs fitting on the composited characteristic obtained by the third unit with a lower degree function. Gradation of the input image is converted based on the composited characteristic after the processing by the fourth unit.

9 Claims, 10 Drawing Sheets

IMAGE PROCESSING APPARATUS, IMAGE PROCESSING METHOD, STORAGE MEDIUM AND PROGRAM

BACKGROUND OF THE INVENTION

1. Field of the Invention

The present invention relates to an image processing apparatus, an image processing system, an image processing method, and a storage medium computer-readably storing processing steps for implementing the method that are used in, for example, an apparatus or a system for capturing a medical digital X-ray image.

2. Related Background Art

With digitization of images in the recent years, progress has been made in digitization of, for example, a medical X-ray image, and it has become possible to obtain a spatial distribution of X-ray intensity as a digital image (digital X-ray image).

As a method for capturing an X-ray digital image, there is such a method as a method for capturing an X-ray digital image through an exciting light distribution by a laser by forming a latent image with respect to an accelerated phosphorescence by X-ray energy, a method of converting a spatial distribution of X-ray intensity to an optical intensity distribution (phosphorous) and directly to an electric signal by an image sensor having a plurality of pixels, and then to an X-ray digital image, or a method for capturing an X-ray digital image after converting a special distribution of X-ray intensity directly to a distribution of electric charge.

There are following and various other advantages of capturing an X-ray digital image (digitizing an X-ray image):

storage and transfer of image data can be efficient;

an optimum image can be easily created by digital image processing (thus, failure in photographing can be easily recovered);

medical image diagnosis can be highly efficient; and costs of medical image diagnosis can be reduced.

In particular, the advantage in that an optimum image can be easily created by digital image processing is the most important advantage of using an X-ray digital image in the field of the medical image diagnosis, and diagnosis by an X-ray digital image is impossible without this digital image processing.

More specifically, in a conventional method of analogically outputting an X-ray image onto a film, a clear and high-contrast image is created utilizing a field with sensitivity exposure density characteristic with respect to X-ray intensity (a field with high gamma) of a film. However, control for this purpose is mainly performed by conditions setting in X-ray photographing, when allowable ranges of photographing conditions are narrow.

Figure 8:
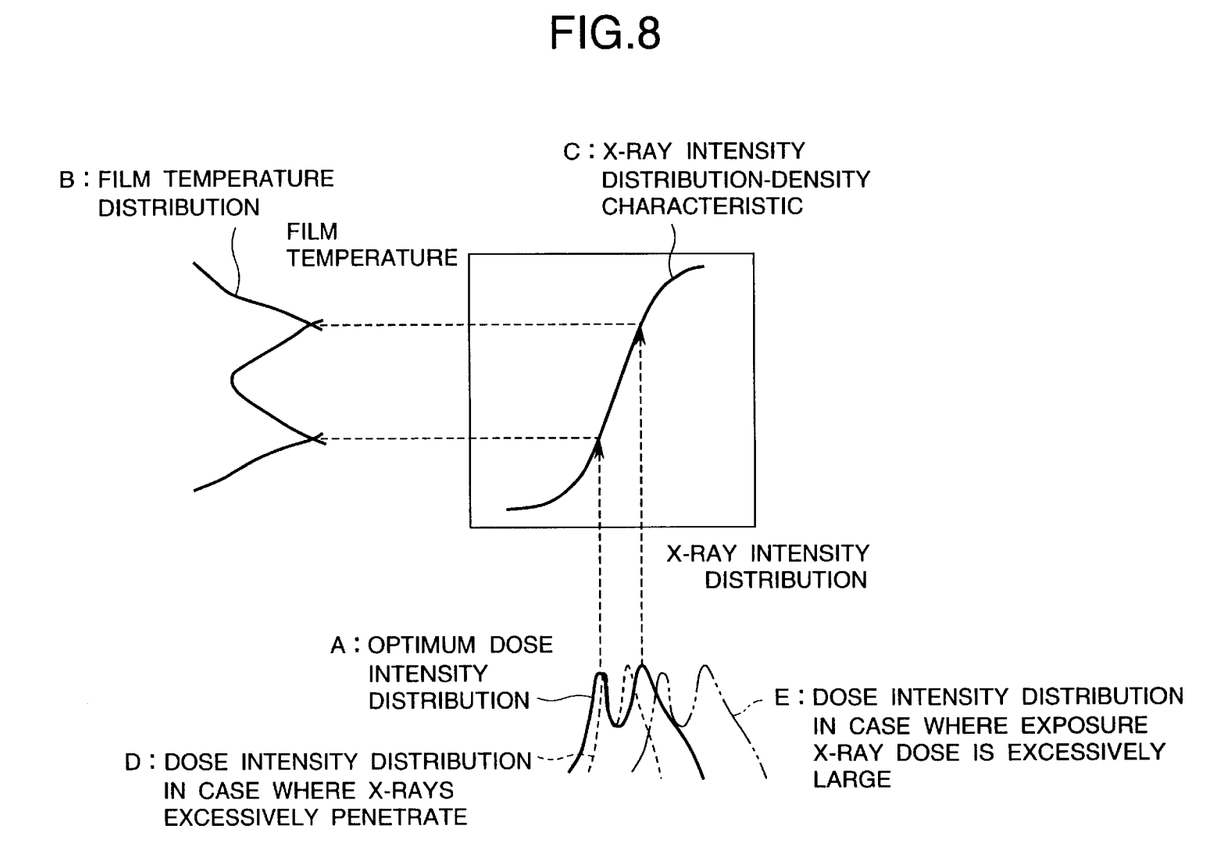
FIG. 8 illustrates a gradation characteristic by a conventional film.

For example, FIG. 8 shows a relation "C" between a numerically indicated incident X-ray dose intensity distribution and film density to be exposed and developed when the X-ray is incident with an X-ray dose in the horizontal axis and film density in the vertical axis.

Here, in FIG. 8, if an optimum X-ray dose intensity distribution such as the one shown by "A" is obtained, an optimum image having a density distribution as shown by "B" that makes it easier for an observer (a physician or the like) to view. However, when photographing is performed with an inappropriate X-ray dose (such as high bulb voltage leading to short wavelength (hard line), and to less human body absorption), a dynamic range of the X-ray dose intensity distribution is narrowed as shown by "D", and an image with an appropriate gradation cannot be obtained. Such a phenomenon can occur even if a thickness of a human body being a subject is thin. In addition, as shown by "E", if an X-ray dose is appropriate but an exposure does is excessive, the entire X-ray dose intensity distribution shifts, and an image with an appropriate density distribution cannot be obtained in this case as well.

Figure 9:
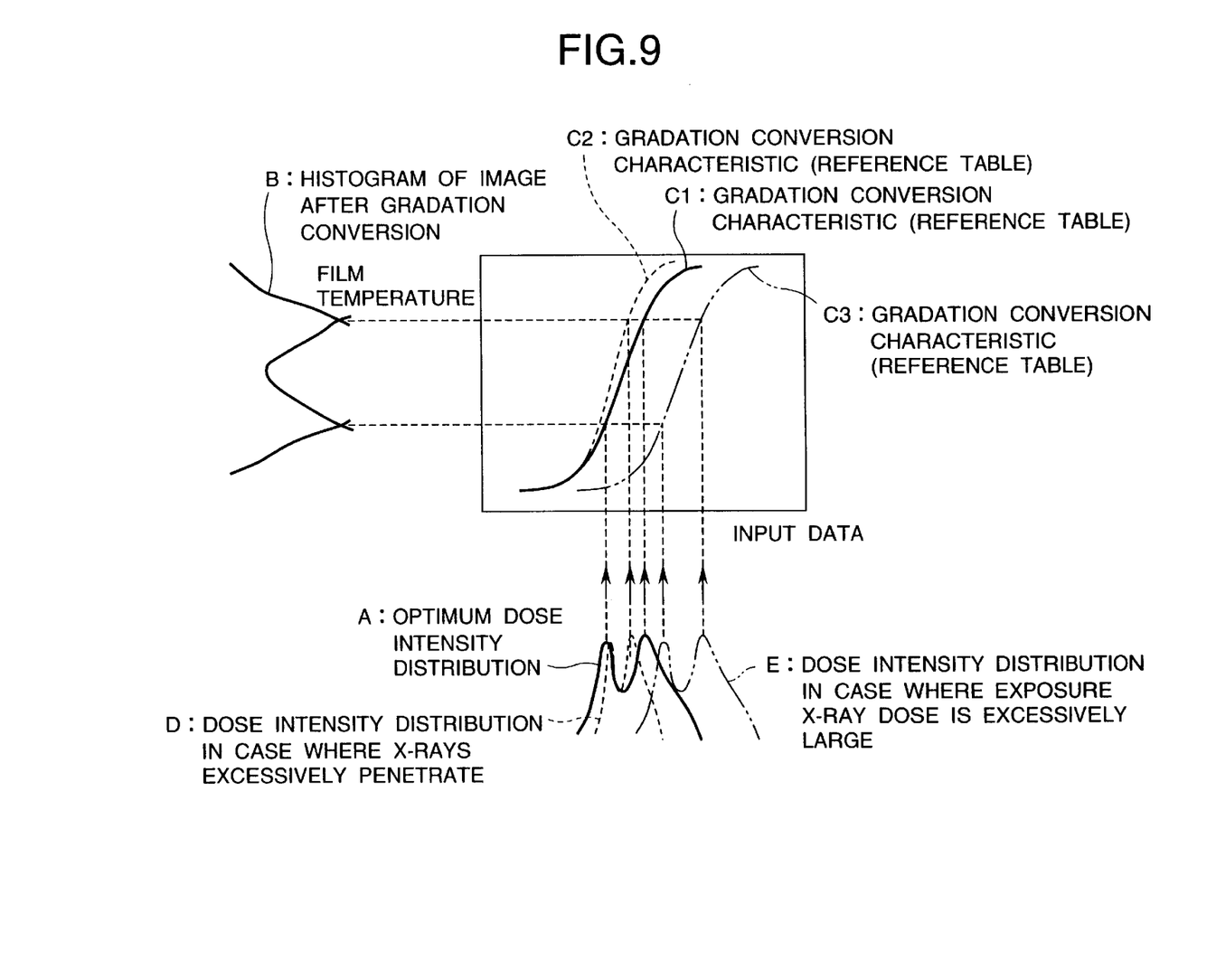
FIG. 9 illustrates gradation conversion of an X-ray digital image.

On the other hand, in an X-ray digital image, various kinds of X-ray dose intensity distributions as shown in FIG. 9 can be obtained once as a digital value. Then, an image having an optimum gradation characteristic (a density characteristic on a film if hard-copied) as indicated by "B" in FIG. 9 can be obtained by various kinds of gradation conversion characteristics (reference table) according to the X-ray intensity distribution as shown in "C1" to "C3" of FIG. 2, and the above-mentioned allowable range of photographing conditions can be substantially extended.

Figure 7:
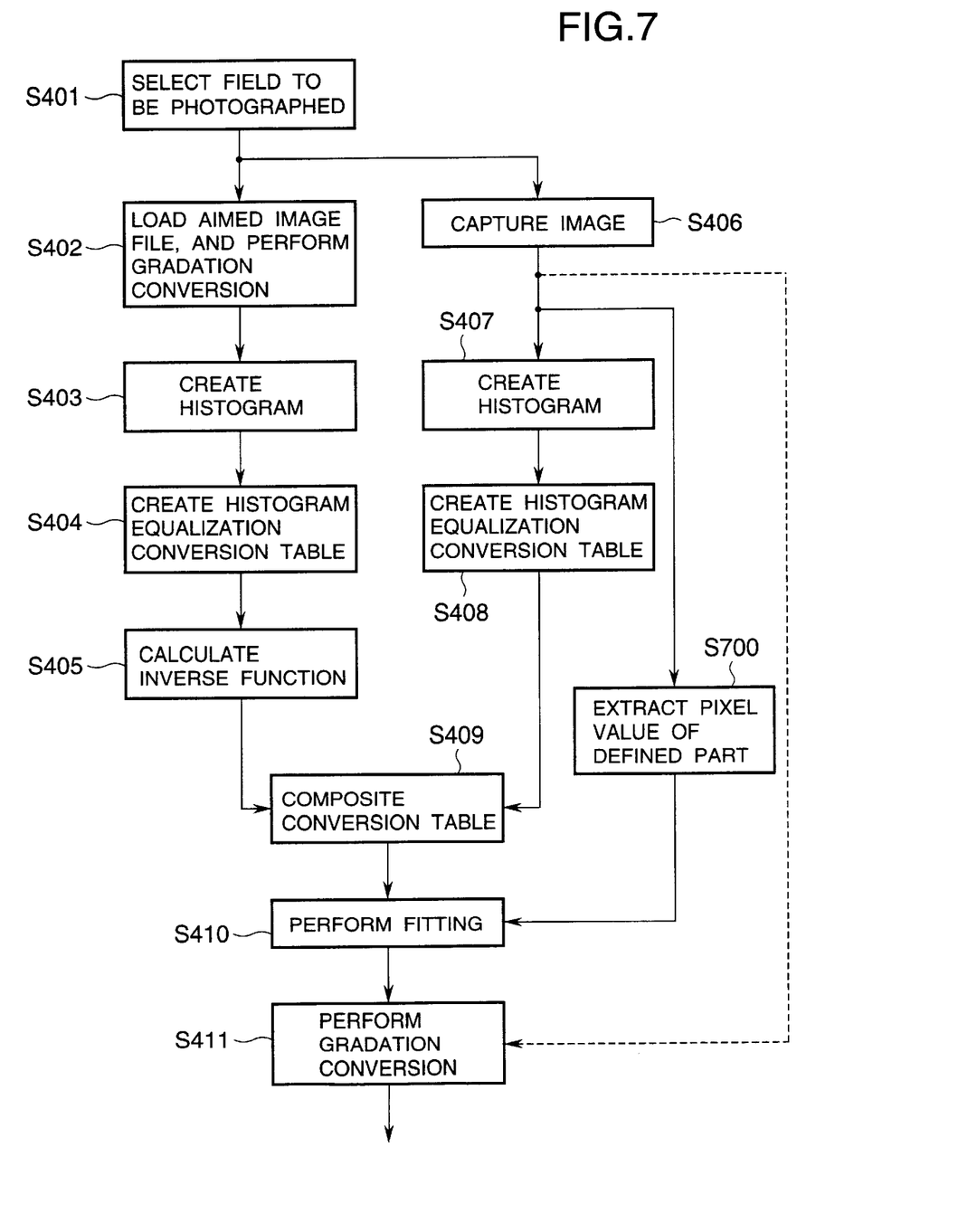
FIG. 7 is a flow chart describing processing by a software program for implementing operations of the X-ray photographing apparatus by the software program.

FIG. 7 shows an X-ray photographing apparatus 800 for capturing an X-ray digital image having the above-mentioned advantages.

In the X-ray photographing apparatus 800, in the case in which a human body 802 lying on a table is photographed as a subject, an X-ray sensor panel 803 converts X-ray dose intensity distributions from an X-ray bulb 801 penetrating through the human body 802 to electric charge distributions and sequentially outputs them. An analog/digital converter 805 digitizes the output of the X-ray sensor panel 803, and stores its digital image data (X-ray digital image data) in a memory 806 once. At this point, a controller 804 controls the timing of exposure by the X-ray bulb 801 and capturing an image.

Here, there are dispersions of an offset and a gain for each pixel in the X-ray sensor panel 803. In order to correct the dispersions, an offset value being an image captured without irradiating an X-ray by the X-ray bulb 801 is stored in the memory 808. In addition, a logarithmically converted version of a gain value being an image captured in the state in which there is not subject (human body 802) is stored in a memory 809.

A conversion unit 807 is for performing logarithmic conversion, and more specifically is a reference table (look-up table).

Therefore, the X-ray digital image data once stored in the memory 806 is logarithmically converted by the conversion unit 807 after the offset in the memory 808 is subtracted by a subtractor 811, and becomes an X-ray intensity distribution image when a difference (division) between the data and the gain of the memory 809 is found by a subtractor 812. This X-ray intensity distribution image is stored in a memory 810 once. Thereafter, the image data stored in the memory 810 is read out from storage, processing, display, hard copy or the like of an image, and is used for medical image diagnosis or the like.

At this point, gradation conversion processing in accordance with a gradation conversion characteristic shown in FIG. 9 is applied to the image data read out from the memory 810, and a gradation conversion characteristic is determined as follows in this gradation conversion processing according to a state at the time of obtaining the image data (image data).

(1) The gradation conversion characteristic is determined such that a density value (output pixel value) of a single or a plurality of arbitrary portions to be designated in an object image is an aimed value.

(2) A histogram of the object image is analyzed to extract a characteristic point of the histogram, and the gradation conversion characteristic is determined such that the characteristic point is an aimed value.

In these methods (1) and (2), a gradation conversion characteristic function is represented by a function having a small number of parameters, and the parameters are determined such that the parameters has a characteristic closest to an aimed value after subtracting a degree of freedom.

However, the conventional method such as the above-mentioned (1) or (2) has unstableness of gradation conversion processing because a complicated operation such as analysis of an object image itself analysis of a histogram of an object image intervenes or the like, a lot of time is required for analysis, computational processing or the like, and in some object images, an analysis mistake may occur.

Figure 10:
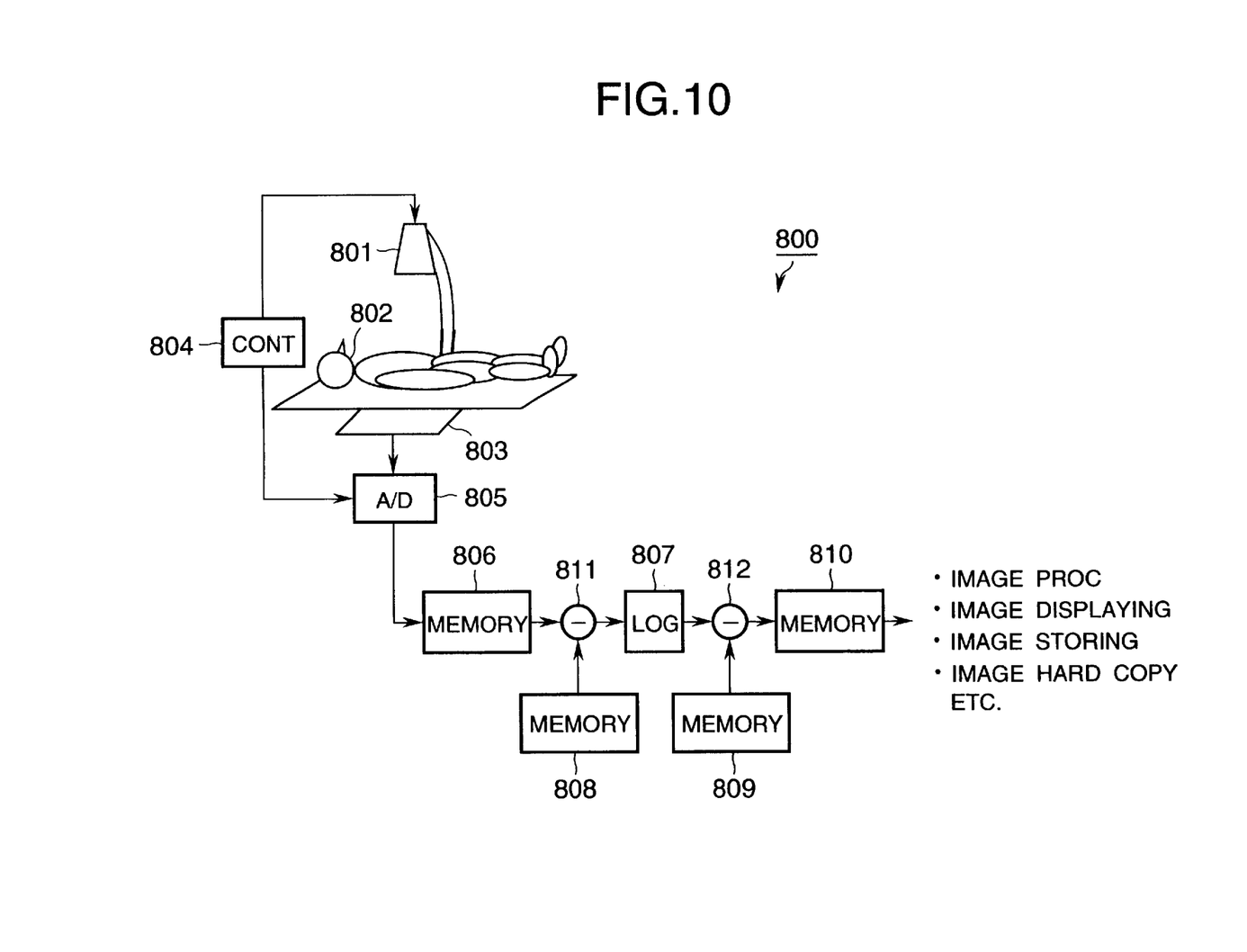
FIG. 10 is a block diagram illustrating a configuration of a conventional X-ray photographing apparatus.

In addition, for example, in the X-ray photographing apparatus (medical X-ray photographing apparatus) shown in FIG. 10, there is a photographing menu for efficiently performing photographing and image processing, and a user selects an item corresponding to a field of a subject (human body field) to be photographed from the photographing menu in advance. Further, there is a setting item for gradation conversion processing peculiar to each field (setting of a parameter to be used for the gradation conversion processing), and the user needs to set a parameter of the gradation conversion processing in advance such that the parameter matches preference of the user or preferable observation conditions. However, the setting operation is an extremely complicated operation because there are various conditions depending on a field.

SUMMARY OF THE INVENTION

The present invention has been devised in order to eliminate the above-mentioned drawbacks, and it is an object of the present invention to enable realization of stable gradation conversion easily and efficiently.

The present invention is an image processing apparatus for applying gradation conversion processing to an input image which comprises:

a first means for obtaining a gradation conversion characteristic for equalizing a histogram of the input image;

a second means for acquiring an inverse characteristic of the gradation conversion characteristic for equalizing a histogram of an aimed image;

a third means for compositing the gradation conversion characteristic obtained by the first means and the inverse characteristic obtained by the second means; and a fourth means for obtaining a gradation conversion function by performing fitting on the composited characteristic obtained by the third means by a lower degree function; and a gradation conversion processing means for applying gradation conversion processing to the input image based on the gradation conversion function obtained by the fourth means.

Other objects of the present invention, and the features thereof, will become fully apparent from the following detailed description which is to be taken in conjunction with the accompanying drawings.

PREFERRED EMBODIMENTS OF THE INVENTION

Embodiments of the present invention will be described with reference to the drawings.

First Embodiment

First, as a method of changing a gradation conversion characteristic used in applying gradation conversion processing to an aimed image to an arbitrary form, there is a method that utilizes equalization of a histogram described in Japanese Patent Application Laid-Open No. 11-96352 and the like. Outlines of this method will be described with reference to FIG. 1.

Figure 1:
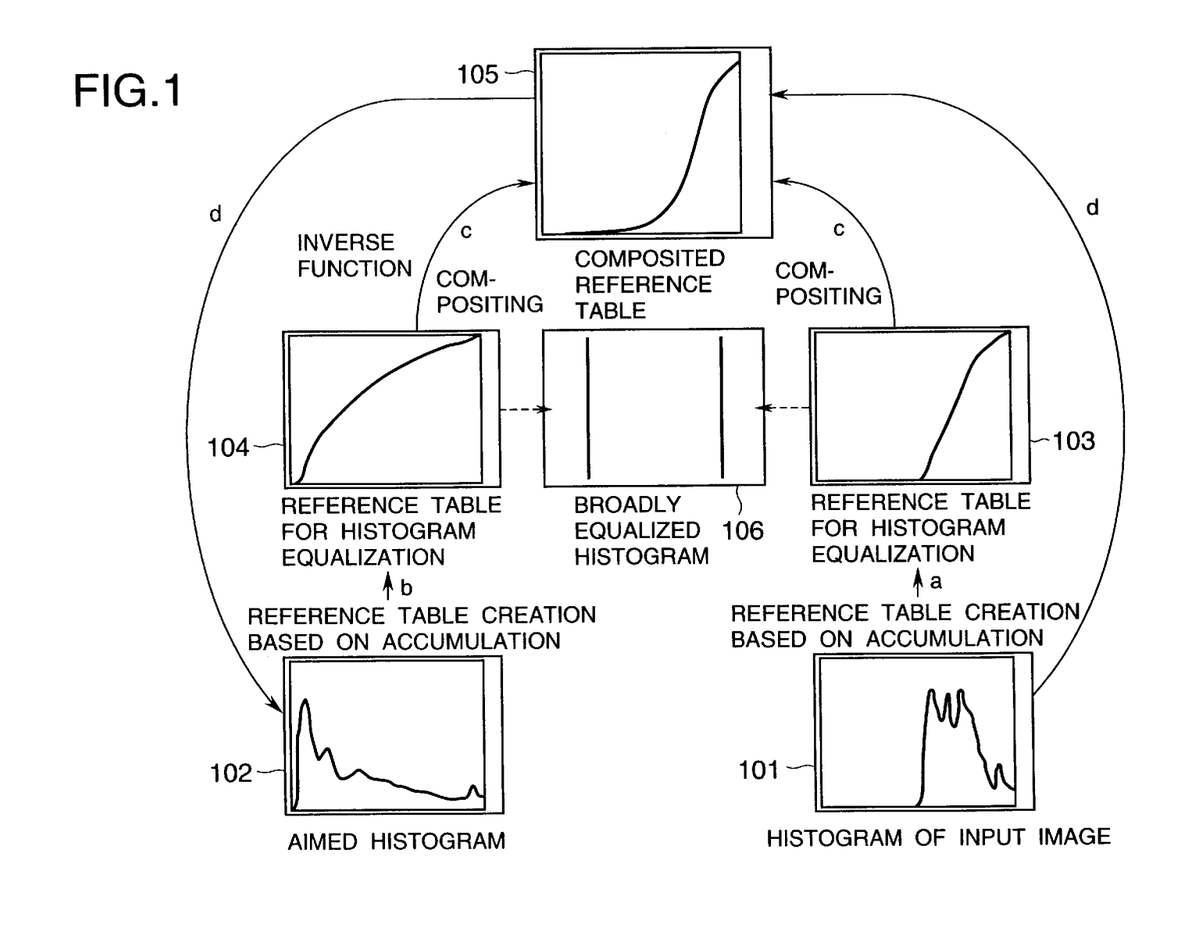
FIG. 1 illustrates image processing method (gradation conversion processing method) to which the present invention is applied in a first embodiment of the present invention.

In FIG. 1, reference numeral 101 denotes a histogram of an X-ray dose (pixel value) of an image (input image) of a specific field of a subject (here, a human body) captured by X-ray photographing, and reference numeral 103 denotes a gradation conversion table for performing gradation conversion for equalizing the histogram 101.

A gradation conversion table 103 is created by accumulating the histogram 101 by a technique called histogram equalization.

Therefore, the gradation conversion table 103 is represented by the following equation 1 assuming that a pixel value of an input image is "x" (Xmin≦x≦Xmax), the histogram 101 is "H(x)", and the gradation conversion table is "L(x)".

$$L(x) = X\min\left(\sum_{i=X\min}^{x} H(i) \bigg/ \sum_{i=X\min}^{X\max} H(i)\right) \times (X\max - X\min) \quad (1)$$

When an input image from which the histogram 101 is obtained is gradationally converted by the gradation conversion table 103, an image having a generally equalized histogram 106 is captured.

On the other hand, reference numeral 102 denotes a histogram (aimed histogram) of an X-ray dose (pixel value) of an image in an ideal state (hereinafter referred to as "an aimed image") of a specific field (identical with a field in an input image) of a subject captured by X-ray photographing.

A gradation conversion table 104 for histogram equalization is created by using the above-mentioned equation 1 for this histogram 102, and an image having the generally equalized histogram 106 is captured.

This means that, if a conversion table having an inverse characteristic (inverse function) of the gradation conversion table 104 for obtaining the histogram 106 from the histogram 102 of an aimed image is created, an image having an equalized histogram can be converted to an image having the ideal histogram 102.

That is, in order to convert an input image from which the histogram 101 is obtained to an aimed image (image in an ideal state) from which the histogram 102 is obtained, it is sufficient to execute the following processing (a) to (d):

(a) creating a gradation conversion table H1(x) for equalizing the histogram 101;

(b) creating a gradation conversion table H2(x) for equalizing the histogram 102 and creating its inverse function $H2^{-1}(x)$;

(c) creating a composited conversion table H0(x)=H1 ($H2^{-1}(x)$) in which the gradation conversion table H1(x) and the inverse function $H2^{-1}$ of the gradation conversion table H2(x) are composited; and (d) converting gradation of an input image from which the histogram 101 is obtained by the composited conversion table H0(x).

Here, what is notable is that only a histogram is used and specific operational processing such as for analyzing a form of a histogram is not included in the processing (a) to (d). Generally, the histogram completely coincides with an aimed histogram.

However, an eventual aim to preferably observe an image is one thing and making a histogram completely coincide with an optimum one is another.

More specifically, in the case of medical X-ray photographing, since a specific field of a human body being a subject is photographed from a specific direction, a histogram form of a photographed image by the medical X-ray photographing is generally similar, although there is some personal difference. Thus, the histogram 102 shown in FIG. 1 (a histogram obtained from an aimed image in an ideal state), that is, an optimum histogram depending on a field (a histogram which a physician is accustomed to, or a histogram clearly indicating a human body structure most clearly) exists, it is somewhat meaningful to make a histogram of a first image (input image) to coincide with the histogram 102. However, even if a form of a histogram is similar to some extent, a personal difference of a human body being a subject cannot be neglected, and it is meaningless to simply making a histogram of an input image to completely coincide with the ideal histogram 102.

That is, in FIG. 1, the gradation conversion table 105 forces the histogram 101 of an input image to completely coincide with the ideal histogram 102, which is not ideal processing.

Ideally, the histogram 101 of an input image should be converted such that it will most approximate to the ideal histogram 102 by a gradation conversion table consisting of a smoothly changing function with low degree of freedom as conventionally used.

That is, near-ideal gradation conversion can be performed by determining a parameter with low degree of freedom function that is approximate to the gradation conversion table H0(x) (the reference table 105 shown in FIG. 1) created by the processing (c) in a most preferable state.

As a function with low degree of freedom, the sigmoid function, its compositing or the like is exemplified, and an application in which an input/output function is regulated by the sigmoid function or its compositing is represented by a neutral network. For example, a method of gradation conversion for converting a histogram of an input image to an ideal form using a neutral network is described in Japanese Patent Application Laid-Open No. 05-168615.

Thus, contrary to the above-described conventional technique, in this embodiment of the present invention, an ideal gradation conversion function is obtained without performing a complicated operation such as learning peculiar to a neutral network (back propagation error).

That is, a gradation conversion processing method of this embodiment is executed by the flow of the following processing (I) to (VII):

(I) setting a form of an ideal histogram, where, as a histogram, a histogram of an image that an observer can observe most easily may be used, which is found while gradationally converting one or a plurality of images interactively;

(II) creating a histogram of an input image;

(III) creating a gradation conversion table H1(x) for equalizing a histogram of an input image;

(IV) creating an inverse function $H2^{-1}(x)$ of a gradation conversion table for equalizing an ideal histogram;

(V) creating a composited conversion table H0(x)=H1 ($H2^{-1}(x)$) in which the gradation conversion table H1(x) and the inverse function $H2^{-1}(x)$ are composited;

(VI) creating a sigmoid function most preferably approximate the composited conversion table H0(x), where the sigmoid function is not limited; and (VII) gradationally converting an input image with the sigmoid function found in the processing (VI) as a gradation conversion table.

In addition, a gradation conversion processing method of this embodiment has an advantage in operating an X-ray photographing apparatus for capturing an X-ray digital image or a system.

More specifically, since photographing conditions, a method of image processing or its conditions is different for each field of a human body that requires treatment or diagnosis in the conventional X-ray photographing apparatus or system, in order to perform image processing (gradation conversion processing, etc.) peculiar to each field, a user needs to select an aimed field from a photographing menu for each field, and to set parameters for image processing with respect to the aimed field (e.g., a conversion density of an aimed field automatically recognized and a numerical value of a conversion density such as a histogram peak automatically recognized).

However, parameters of image processing that can be set by a user are limited. It does not cause any problem if an image in a state desired by a user can be obtained by the setting of parameters in this available range, in fact, a user often desires an image having an atmosphere that cannot be expressed by a small number of parameters or words such as if an overall image has well-arranged gradation.

Thus, in this embodiment, when a user selects an arbitrary field from a photographing menu, an image itself representing a selected field or its histogram itself can be set as an object of image processing instead of a parameter of image processing (gradation conversion processing, etc.).

A representative image (aimed image) is the one interactively created by a user in advance (while moving a gradation conversion table). Therefore, it will suffice if a user set an ideal image itself or it histogram instead of setting a parameter of image processing.

Second Embodiment

Figure 2:
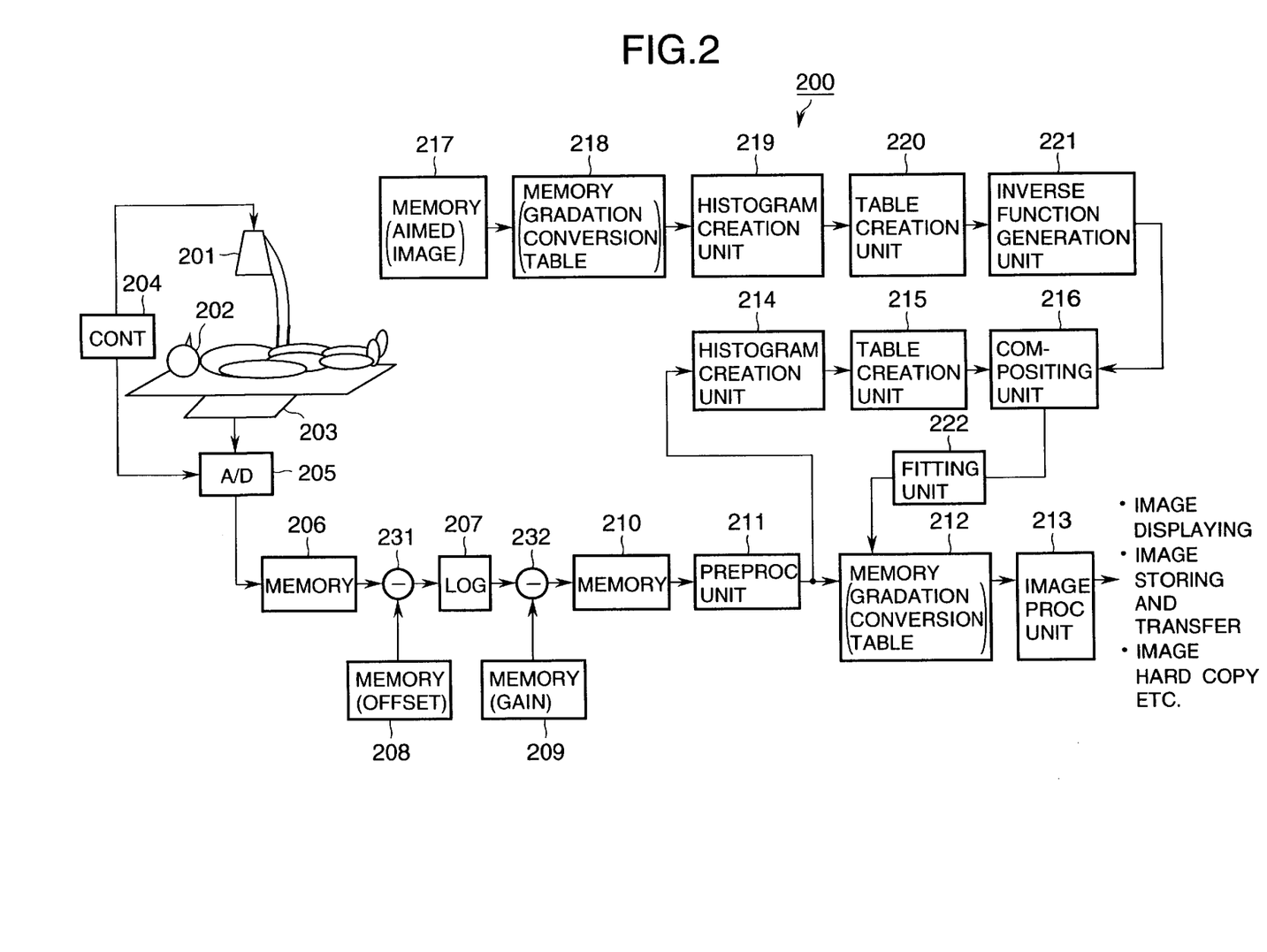
FIG. 2 is a block diagram illustrating a configuration of an X-ray photographing apparatus to which the present invention is applied in a second embodiment of the present invention.

The present invention is applied to an X-ray photographing apparatus 200 such as the one shown in FIG. 2. The X-ray photographing apparatus implements the method of image processing (gradation conversion processing) of the first embodiment.

<Configuration of the X-Ray Photographing Apparatus 200>

As shown in FIG. 2, the X-ray photographing apparatus 200 is provided with an X-ray bulb 201 for emitting an X-ray to a subject (human body) 202, an X-ray sensor panel 203 for converting X-ray dose intensity distributions of the X-ray penetrating through the subject 202 to electric charge distributions and sequentially outputting them, an analog/digital converter 205 for digitizing an output of the X-ray sensor panel 203 and outputting it as X-ray digital image data, a controller 204 for controlling timings or the like for irradiating an X-ray at the X-ray bulb 201 and for obtaining X-ray digital image data, a memory 206 for storing the X-ray digital image data outputted from the analog/digital converter 205, a memory 208 for storing an offset value that is an image captured without irradiating an X-ray, a memory 209 for storing a value found by logarithmically converting a gain value that is an image captured in a state in which the subject 202 does not exist, a subtractor 231 for performing subtraction processing of data in the memory 206 and data in the memory 208, a converter 207 for logarithmically converting processing results in the subtractor 231, a subtractor 232 for performing subtraction processing (division) of conversion results in the converter 207 and data in the memory 209, a memory 210 for storing processing results (intensity distribution image data of an X-ray) in the subtractor 232, a pre-processing unit 211 for applying pre-processing to image data in the memory 210, a histogram creation unit 214 for creating a histogram of image data after pre-processing in the pre-processing unit 211, a table creation unit 215 for creating a histogram equalization table (gradation conversion table) based on a histogram created in the histogram creation unit 214, a memory 217 for storing aimed image data, a memory 218 for storing an aimed gradation conversion table, a histogram creation unit 219 for creating a histogram of the aimed image data in the memory 217 which is gradationally converted by the aimed gradation conversion table in the memory 218, a table creation unit 220 for creating a histogram equalization table (gradation conversion table) based on the histogram created in the histogram creation unit 219, an inverse function generation unit 221 for generating an inverse function of the histogram equalization table created in the table creation unit 220, a compositing unit 216 for compositing the histogram equalization table created in the table creation unit 215 and a table of the inverse function generated in the inverse function generation unit 221, a fitting unit 222 for performing fitting on the composited conversion table obtained in the compositing unit 216 by a lower degree function, a memory 221 for storing a compositing conversion table after the processing in the fitting unit 222, and an image processing unit 213 for applying other image processing to the output of the pre-processing unit 211 that is gradationally converted by the compositing conversion table in the memory 212.

Figure 3:
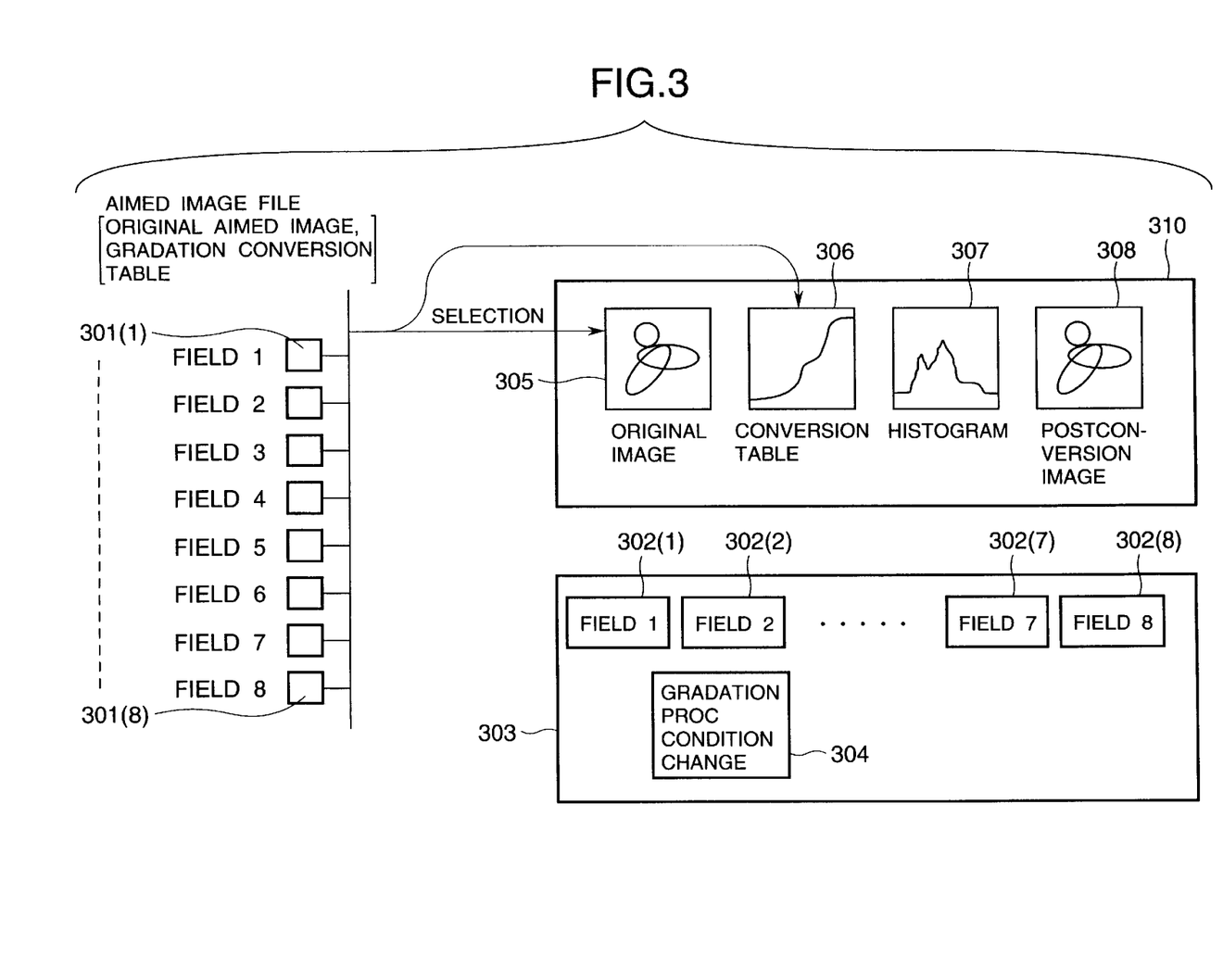
FIG. 3 illustrates a configuration of an operation panel and a display of the X-ray photographing apparatus.

In addition, the X-ray photographing apparatus 200 is provided with an operation panel and a display function as shown in FIG. 3.

In FIG. 3, reference numeral "303" denotes an operation panel that is provided in the X-ray photographing apparatus 200 body and is operated by a user.

Reference numerals "302(1), 302(2), ... and 302(8)" denote a plurality of buttons "302(1), 302(2), ... and 302(8)" provided on the operation panel 303, which are provided associated with various kinds of photographing field of the subject 202 (a field 1, field 2, ... of a human body) as a photographing menu.

Reference numeral "304" denotes a button for instructing change or confirmation of gradation processing conditions.

Reference numerals "301(1), 301(2), ... and 301(8)" denotes a plurality of memories corresponding to the plurality of buttons 302(1), 302(2), ... and 302(8) on the operation panel 303, and the memories 301(1), 301(2), ... and 301(8) are provided in the X-ray photographing apparatus 200. In each of the memories 301(1), 301(2), ... and 301(8), an image (original image) aimed by gradation processing of an object field and its ideal gradation conversion table are filed. For example, in the memory 301(1) corresponding to the button 302(1), an image aimed by gradation processing of the field 1 and it ideal gradation conversion table are filed.

Further, the original images and the gradation conversion tables stored in each of the memories 301(1), 301(2), ... and 301(8) are not limited to the number of the memories, but it is possible to store one or a plurality of original images and gradation conversion tables.

Reference numeral "310" denotes a display provided in the X-ray photographing apparatus 200 body, on which an original image 305, a gradation conversion table 306, a histogram 307 and a gradation conversion image 308 are displayed.

<Overall Operation of the X-Ray Photographing Apparatus 200: see FIG. 1>

The X-ray emitted from the X-ray bulb 201 by the control of the controller 204 penetrates through the subject 202 and reaches the X-ray sensor panel 203.

The X-ray sensor panel 203 converts X-ray intensity distributions to electric charge distributions and sequentially outputs them.

The analog/digital converter 205 digitizes an output of the X-ray sensor panel 203 and outputs X-ray digital image data in accordance with control from the controller 204. This X-ray digital image data is X-ray digital image data of an arbitrary field of the subject 202 currently being photographed.

The X-ray digital image data outputted from the analog/digital converter 205 (hereinafter referred to as "input image data") is stored in the memory 206 once.

Here, the X-ray sensor panel 203 has dispersion of an offset and a gain for each pixel.

Thus, in order to correct this dispersion, the subtractor 231 subtracts an offset value (image data obtained without irradiating an X-ray) in the memory 208 from the input image data in the memory 231.

The converter 207 is more specifically a reference table (look-up table), and logarithmically converts input image data after subtraction processing in the subtractor 231.

The subtractor 232 founds a difference (division) between the input image data after logarithmical conversion in the converter 207 and a gain value (a value that is found by logarithmically converting image data obtained in a state in which the subject 202 does not exist) in a memory 209.

The input image data (X-ray intensity distribution image data) after the subtraction processing in the subtractor 232 is stored in the memory 210 once.

The pre-processing unit 211 applies necessary image processing to the input image data in the memory 210 before gradation conversion processing.

The input image data after the processing in the pre-processing unit 211 is supplied to the histogram creation unit 214 and the memory 212 respectively, and is used for two operations; an operation by processing units after the histogram creation unit 214 and an operation by processing units after the memory 212.

The histogram creation unit 214 creates a histogram of the input image data from the pre-processing unit 211.

The table creation section 215 creates a histogram equalization table (gradation conversion table) utilizing the histogram created in the histogram creation unit 214.

At this point, aimed image data corresponding to a field of the subject 202 selected by the user from an operation panel is stored in the memory 217, whose details will be described later.

In addition, a gradation conversion table for performing gradation processing to be aimed that is adjusted by the user from the operation panel is stored in the memory 218.

Therefore, the aimed image data in the memory 217 becomes an image indicating ideal gradation by passing through the gradation conversion table in the memory 218, and is supplied to the histogram creation unit 219.

The histogram creation unit 219 creates a histogram of the aimed image data from the memory 218.

The table creation unit 220 creates a histogram equalization table (gradation conversion table) utilizing the histogram created in the histogram creation unit 219. The inverse function generation unit 221 generates an inverse function of the gradation conversion table created in the table creation unit 220.

The compositing unit 216 composites the gradation conversion table created in the table creation unit 215 (the gradation conversion table created from a histogram of an input image) and the inverse function table generated in the inverse function generation unit 221 (a table of an inverse function of the gradation conversion table created from a histogram of an aimed image).

The fitting unit 222 performs fitting on the composited conversion table obtained in the compositing unit 216 by a lower degree function.

The compositing conversion table after the processing in the fitting unit 222 is stored in the memory 212.

Therefore, the input image data outputted from the pre-processing unit 211 to the memory 212 is converted to gradation desired by the user by passing through the compositing conversion table in the memory 212, and is supplied to the image processing unit 213.

The image processing unit 213 applies anther arbitrary image processing to the input image data from the memory 212. The input image data after this processing is utilized for display, storage, transfer, hard copy, or the like of an image.

<Operation of an Operation Panel and a Display Function: See FIG. 3>

When changing gradation conversion processing conditions, a user first presses the gradation processing conditions changing button 304, selects a button corresponding to a field that the user attempts to change out of the buttons 302(1), 302(2), . . . and 302(8) and presses the button.

In this way, an original image and a gradation conversion table in a memory corresponding to the button selected by the user in the memories 301(1), 302(2), . . . , 301(8), i.e., in memory corresponding to the field that the user attempts to change are read out with respect to the memories 217 and 218 (see FIG. 1) respectively, and are displayed on the display 310 as the original image 305 and the gradation conversion table 306. Then, the histogram creation unit 220 (see FIG. 1) creates a histogram of the original image in the memory 217. The created histogram is displayed as the histogram 307 on the display 310.

At this point, since the gradation conversion table 306 from the user has not been changed yet, an image in the same state as the original image 305 is displayed on the display 310 as the gradation conversion image 308.

Next, the user interactively changes the gradation conversion table 306 while confirming the original image 305 displayed on the display 310.

In accordance with the change of the gradation conversion table 306, the gradation conversion table in the memory 218 (see FIG. 1) is changed as well. Thus, the original image in the memory 217 becomes an image of gradation based on the change by passing through the gradation conversion table after change in the memory 218, and is displayed on the display 310 as the gradation conversion image 308. In addition, the histogram creation unit 220 (see FIG. 1) creates a histogram of the original image after gradation conversion that has passed through the memory 218. The created histogram is displayed on the display 310 as the histogram 307.

Then, the user adjusts the gradation conversion image 308 such that the gradation conversion image 308 will be the one that can be observed easily or that matches the user's preference, and after the adjustment, the user presses the gradation processing conditions changing button 304 again.

Thus, the gradation conversion table existing in the memory 218 at this point is registered as a gradation conversion table of an aimed image to be actually used for processing. Further, the histogram itself in the memory 220 may be registered together with the gradation conversion table.

When the gradation conversion table in the memory 218 is registered as a gradation conversion table of an aimed image as described above, processing in the X-ray photographing apparatus 200 as described in the <overall operations of the X-ray photographing apparatus 200: see FIG. 1> is executed in the gradation conversion table.

Figure 4:
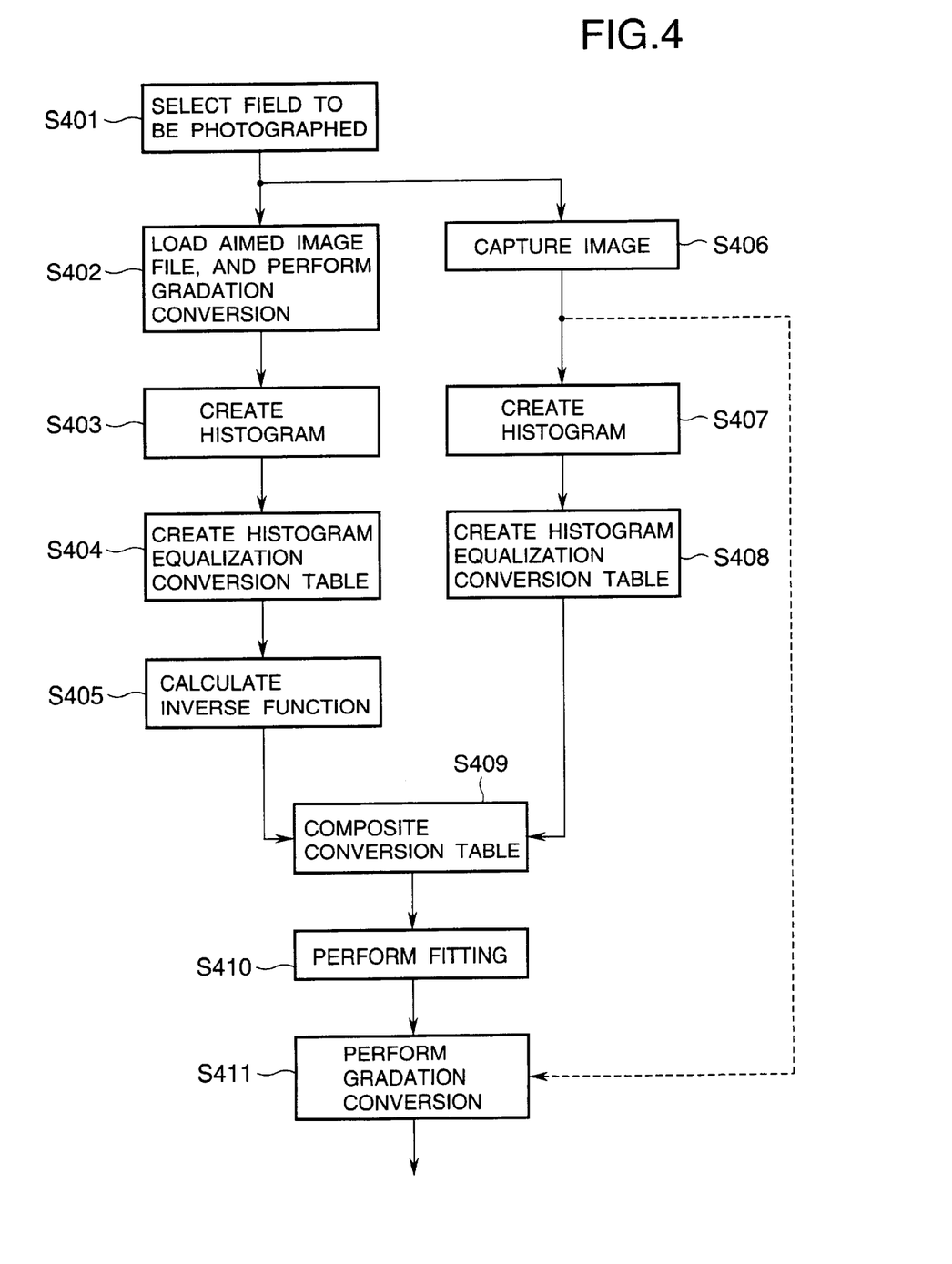
FIG. 4 is a flow chart describing processing by a software program for implementing operations of the X-ray photographing apparatus by the software program.

FIG. 4 shows a processing flow chart of a software program for implementing gradation conversion processing in the X-ray photographing apparatus 200 as described above by the software program.

The user first selects a field to be photographed using the buttons 302(1), 302(2), . . . and 302(8) of the operation panel 303 (step S401).

By selection operation by the user in step S401, an original image and a gradation conversion table in a memory corresponding to the selected button among the memories 301(1), 301(2), . . . and 301(8) are read out respectively (step S402). These original image and gradation conversion table are displayed on the display 310 as the original image 305 and the gradation conversion table 306.

Next, by the gradation conversion table read out in step S402, a histogram of an image that is a gradationally converted version of the original image read out in the step is created (step S403).

The histogram created in step S403 is displayed on the display 310 as the histogram 307.

Then, when an adjustment operation of a gradation conversion table is performed by the user, the gradation conversion table 306, the histogram 307 and the gradation conversion image 308 are changed in accordance with the adjustment operation and displayed on the display 310.

Next, when the user finishes the adjustment operation, a conversion table for equalizing the histogram created in step S403 is created at this point (step S404).

Next, an inverse function table of the gradation conversion table created in step S404 is created (step S405).

On the other hand, photographed image data (input image data) of the subject is obtained by X-ray photographing (step S406).

Next, a histogram of the input image data obtained in step S406 is created (step S407).

Next, a gradation conversion table for equalizing the histogram created in step S407 is created (step S408).

When the processing of step S401 to S408 ends, a composited conversion table is created by compositing the inverse function table obtained in step S405 and the gradation conversion table obtained in step S408 (step S409).

Fitting is performed on the composited conversion table obtained in step S409 by a lower degree function (step S410), and gradation conversion processing is applied to the input image data obtained in step S406 using the composited conversion table after the fitting (step S411).

Further, in the case in which a gradation conversion table for equalizing a histogram, information of an invalid field such as background information of an aimed image may be deleted from the histogram or neglected.

Third Embodiment

Although a favorable view of an entire image can be substantially attained by approximating it histogram to an aimed histogram, it is desired in a medical image to fix a pixel value (density value) of a specific field and attain a stable diagnosis capability.

Figure 5:
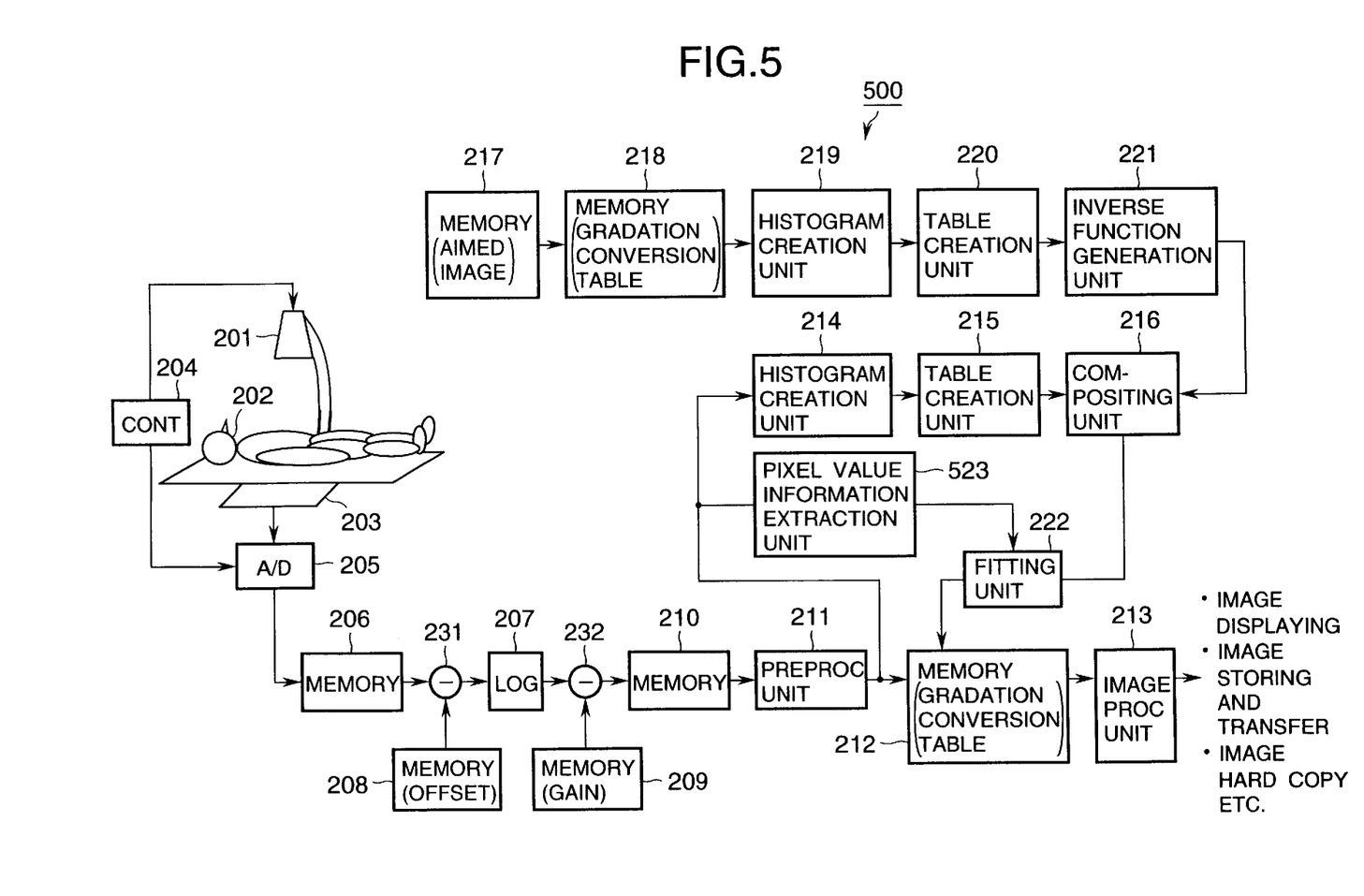
FIG. 5 is a block diagram describing a configuration of the X-ray photographing apparatus to which the present invention is applied in a third embodiment of the present invention.

Thus, in this embodiment, the present invention is applied to an X-ray photographing apparatus 500 as shown in FIG. 5.

Although the X-ray photographing apparatus 500 has a configuration similar to that of the X-ray photographing apparatus 200 of FIG. 2, it is particularly different from the configuration requirements provided in the X-ray photographing apparatus 200 in that an pixel value information extraction unit 523 is further provided.

Further, in the X-ray photographing apparatus 500 of FIG. 5, same reference symbols are attached to parts that operate in the same manner as those in the X-ray photographing apparatus 200 of FIG. 2, and their detailed description is omitted.

That is, in the X-ray photographing apparatus 500 of this embodiment, an image to be an aim of gradation processing of an object field (an original image) and its ideal gradation conversion table are filed with respect to the memories 301(1), 301(2), . . . and 301(8) shown in FIG. 3, and at the same time, a defined established value {y(j); =0, . . . , n; n is an integer equal to or greater than one} as a density value (final pixel value) of the object field is also filed.

Therefore, when a photographed field is selected by the user using the operation panel 303, the original image, the gradation conversion table and the defined established value {y(j); =0, . . . , n; n is an integer equal to or greater than one} are read out from a memory corresponding to the selection.

The pixel information extracting unit 523 extracts a pixel value (one or a plurality of pixel values) {x(j); =0, . . . , n; n is an integer equal to or greater than one} of a defined part from the input image data after the processing in the pre-processing unit 211.

As a method for extracting a pixel value in the pixel value information extraction unit 523, there are, for example, a method for extracting a pixel value of a defined position in an object image, a method of extracting an average value of pixel values around a pixel in a defined position in the object image and a method for analyzing the object image itself to detect a specific position from the shape of the subject region in the object image and extracting an average value of pixel values in that position or pixel values around it.

Although the fitting unit 222 is a processing unit for performing fitting by a lower degree function in the second embodiment, fitting is performed with restraining conditions that the defined established value {y(j); =0, . . . , n; n is an integer equal to or greater than one} read out at the time of selecting a photographed field of the user corresponds to the pixel value (one or a plurality of pixel values) {x(j); =0, . . . , n; n is an integer equal to or greater than one} obtained in the pixel value information extraction unit 523 in this embodiment.

Figure 6:
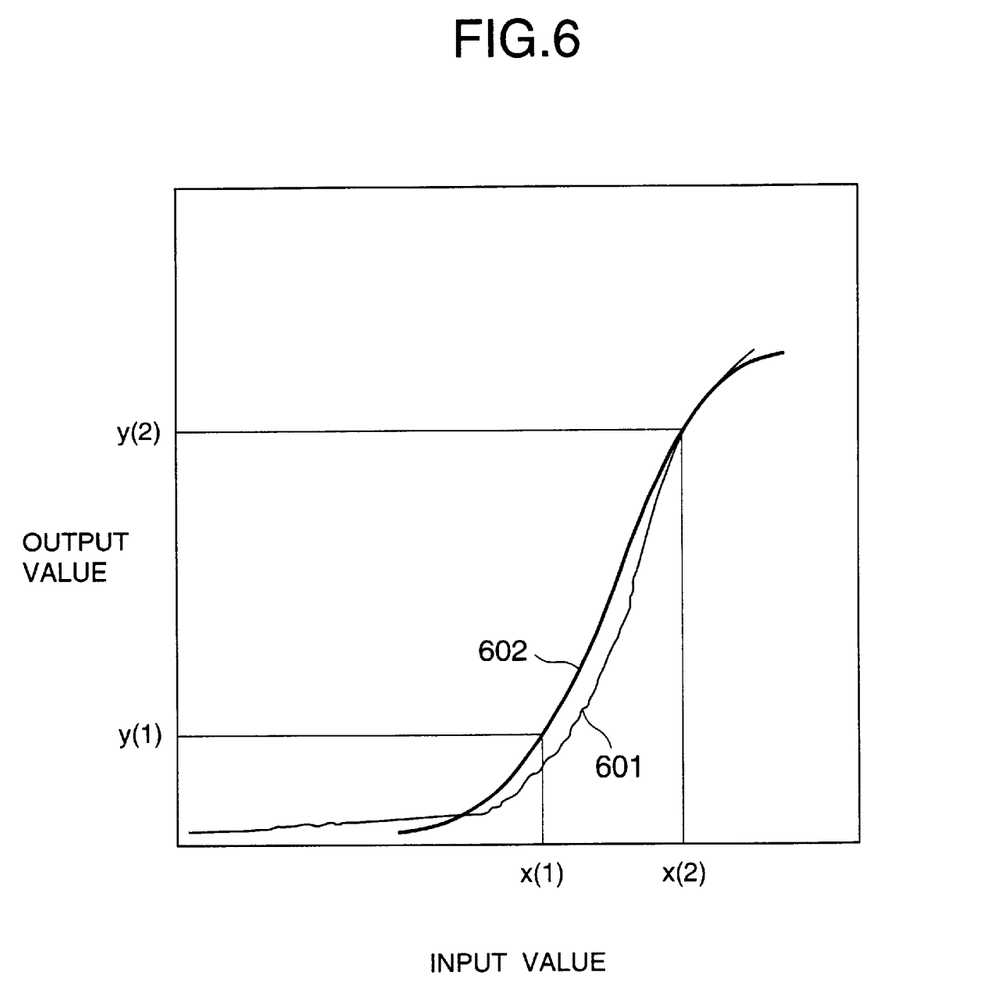
FIG. 6 illustrates fitting processing in the X-ray photographing apparatus.

FIG. 6 shows a situation of fitting in the fitting unit 222 in this embodiment.

As shown in FIG. 6, when n=2 (densities of pixel in two points are matched), fitting is performed on a function 602 of the composited conversion table obtained by the compositing unit 216 by a lower degree function 601, and at this point, as restraining conditions, fitting is performed such that y(1) corresponds to x(1), y(2) corresponds to x(2).

Further, at least two or more function parameters are required.

A processing chart of a software program for implementing gradation conversion processing by the X-ray photographing apparatus 500 as described above by the software program will be as shown in FIG. 7.

That is, step S700 for extracting the pixel value (one or a plurality of pixel values) {x(j); =0, . . . , n; n is an integer equal to or greater than one} of a defined part of the input image data obtained in step S406 is added to the flow chart shown in FIG. 4, and in the fitting processing in step S410, fitting is performed with restraining conditions that the defined established value {y(j); =0, . . . , n; n is an integer equal to or greater than one} read out at the time of selecting a photographed field of the user in step S401 corresponds to the pixel value (one or a plurality of pixel values)) {x(j); =0, . . . , n; n is an integer equal to or greater than one} obtained in step S700.

Further, it goes without saying that the object of the present invention can be attained by supplying a storage medium storing a program code of software for realizing the functions of the host and the terminal of the first through third embodiments to a system or an apparatus, and a computer (or a CPU or an MPU) of the system or the apparatus reading out the program code stored in the storage medium to execute the program code.

In this case, the program code itself read out from the storage medium realizes the functions of the first through third embodiments, and the storage medium storing the program code constitutes the present invention.

As a storage medium for supplying a program code, an ROM, a floppy disk, a hard disk, an optical disk, a magneto-optical disk, a CD-ROM, a CD-R, a magnetic tape, a non-volatile memory card or the like can be used.

In addition, it goes without saying that, by executing a program code read out by a computer, not only the functions of the first through third embodiments are realized, but also the functions of the first through third embodiments are realized by an OS or the like running on the computer performing a part or all of actual processing based on an instruction of the program code.

Moreover, it goes without saying that, after the program code read out from the storage medium is written in a memory provided in a function extension board inserted in a computer or a function extension unit connected to a computer, the functions of the first through third embodiments are realized by a CPU or the like provided in the function extension board or the function extension unit performing a part or all of actual processing based on an instruction of the program code.

The present invention has been explained by certain preferred embodiments. However the present invention is by no means limited to such embodiments but is naturally subject to various modifications and applications within the scope and spirit of the appended claims.

What is claimed is:

1. An imaging apparatus for performing a gradation conversion process on an original image, said apparatus comprising:

first forming means for forming an accumulation histogram of the original image, and generating a first gradation conversion table based on the formed accumulation histogram of the original image;

second forming means for forming an accumulation histogram of an aimed image, and generating a second gradation conversion table based on the formed accumulation histogram of the aimed image;

first generating means for generating an inverse conversion table of the second gradation conversion table generated by said second forming means;

second generating means for generating a composite table obtained by compositing the first gradation conversion table generated by said first forming means and the inverse conversion table generated by said first generating means;

third generating means for generating a gradation conversion function by fitting the composite table by a function; and gradation conversion means for performing the gradation conversion process on the original image based on the gradation conversion function.

2. An apparatus according to claim 1, wherein said third generating means means performs the fitting with restraining conditions in which a defined density conversion point is fixed.

3. An apparatus according to claim 2, further comprising extracting means for extracting data of the defined density conversion point out of the original image.

4. An apparatus according to claim 1, further comprising a plurality of memory means for storing a plurality of aimed images, wherein said second generating means uses the aimed image which corresponds to an instruction of a user from among the plurality of aimed images.

5. An apparatus according to claim 4, wherein the plurality of aimed images correspond to each photographed part of a subject in radiation photographing.

6. An apparatus according to claim 1, further comprising operating means for changing a gradation of the aimed image, wherein the result of said operating means is set as a new aimed image.

7. An apparatus according to claim 1, further comprising irradiation means for irradiating a subject; and sensor means for picking up an image from the irradiation by said irradiation means, wherein the original image is an image picked up by said sensor means.

8. An imaging method of performing a gradation conversion process on an original image, said method comprising the steps of:

forming an accumulation histogram of the original image, and generating a first gradation conversion table based on the formed accumulation histogram of the original image;

forming an accumulation histogram of an aimed image, and generating a second gradation conversion table based on the formed accumulation histogram of the aimed image;

generating an inverse conversion table of the second gradation conversion table generated in said second forming step;

generating a composite table obtained by compositing the first gradation conversion table generated in said first forming step and the inverse conversion table generated in said first generating step;

generating a gradation conversion function by fitting the composite table by a function; and performing the gradation conversion process on the original image based on the gradation conversion function.

9. A storage medium storing a computer program executing an imaging method of performing a gradation conversion process on an original image, said method comprising the steps of:

forming an accumulation histogram of the original image, and generating a first gradation conversion table based on the formed accumulation histogram of the original image;

forming an accumulation histogram of an aimed image, and generating a second gradation conversion table based on the formed accumulation histogram of the aimed image;

generating an inverse conversion table of the second gradation conversion table generated in said second forming step;

generating a composite table obtained by compositing the first gradation conversion table generated in said first forming step and the inverse conversion table generated in said first generating step;

generating a gradation conversion function by fitting the composite table by a function; and performing the gradation conversion process on the original image based on the gradation conversion function.

* * * * *

UNITED STATES PATENT AND TRADEMARK OFFICE
CERTIFICATE OF CORRECTION

PATENT NO. : 6,819,794 B2
DATED : November 16, 2004
INVENTOR(S) : Hitoshi Inoue

It is certified that error appears in the above-identified patent and that said Letters Patent is hereby corrected as shown below:

Column 1,
Line 11, "method" should read -- methods --; and
Line 65, "that" should be deleted.

Column 2,
Line 7, "does" should read -- dose --; and
Line 33, "an" should read -- of an --.

Column 3,
Line 10, "has" should read -- have --;
Line 15, "image" should read -- image, --; and
Line 15, "itself" should be deleted.

Column 5,
Line 50, "making" should read -- make --.

Column 6,
Line 29, "mate" should read -- mating --; and
Line 66, "or it" should read -- or its --.

Column 8,
Line 8, "denotes" should read -- denote --;
Line 17, "and it" should read -- and its --; and
Line 55, "founds" should read -- finds --.

Column 9,
Line 45, "anther" should read -- another --.

Column 10,
Line 46, "table" should read -- tables --.

Column 11,
Line 20, "it" should read -- its --; and
Line 57, "are," should read -- is, --.

Column 12,
Line 67, "However" should read -- However, --.

UNITED STATES PATENT AND TRADEMARK OFFICE
CERTIFICATE OF CORRECTION

PATENT NO. : 6,819,794 B2
DATED : November 16, 2004
INVENTOR(S) : Hitoshi Inoue

It is certified that error appears in the above-identified patent and that said Letters Patent is hereby corrected as shown below:

<u>Column 13,</u>
Line 32, "means" (second occurrence) should be deleted.

Signed and Sealed this

Sixteenth Day of August, 2005

JON W. DUDAS
*Director of the United States Patent and Trademark Office*